United States Patent [19]

Kotani

[11] Patent Number: 5,625,739

[45] Date of Patent: Apr. 29, 1997

[54] EDITING APPARATUS USING DELAY MEANS FOR INSERTING A DESIRED SIGNAL INTO A DESIRED PORTION OF A PRERECORDED SIGNAL AND FOR ERASING SEGMENTS OF A PRERECORDED SIGNAL WITHOUT CREATING A BLANK PORTION IN THE PRERECORDED SIGNAL

[75] Inventor: Hiroki Kotani, Tokyo, Japan

[73] Assignee: Sony Corporation, Tokyo, Japan

[21] Appl. No.: 628,403

[22] Filed: Apr. 5, 1996

Related U.S. Application Data

[63] Continuation of Ser. No. 230,700, Apr. 21, 1994, abandoned.

[30] Foreign Application Priority Data

Apr. 26, 1993 [JP] Japan .................. 5-099296

[51] Int. Cl.[6] ........................................ H04N 5/93
[52] U.S. Cl. .................. 386/52; 386/110; 360/13
[58] Field of Search ........................ 360/13, 14.1, 7, 360/22, 26, 57, 61; 358/335; 386/52, 110

[56] References Cited

U.S. PATENT DOCUMENTS

| | | | |
|---|---|---|---|
| 4,389,680 | 6/1983 | Gramling | 360/14.1 |
| 4,408,309 | 10/1983 | Kiesling et al. | 360/7 X |
| 4,612,569 | 9/1986 | Ichinose | 360/14.1 X |
| 4,665,443 | 5/1987 | Tanaka | 360/7 |
| 4,698,664 | 10/1987 | Nichols et al. | 360/14.1 X |
| 4,706,135 | 11/1987 | Kojima | 360/14.1 |

FOREIGN PATENT DOCUMENTS 1-300487  12/1989  Japan .

Primary Examiner—Andrew L. Sniezek
Attorney, Agent, or Firm—William S. Frommer; Alvin Sinderbrand

[57] ABSTRACT

There is disclosed an editing machine for performing a nonlinear edit by a fewer number of video tape recorders than heretofore without requiring a dubbing operation. Where the nonlinear edit is an insertion of other signal, the editing machine comprises a first video tape recorder for reproducing a signal from tape, a second video tape recorder, and a switcher. The first video tape recorder has a delay circuit for delaying the reproduced signal to produce an output signal delayed by a first amount and an output signal delayed by a second amount. The switcher selects one of the signals from the first video tape recorder and the reproduced signal from the second video tape recorder. In the output signal from the switcher, the reproduced signal from the second video tape recorder has been inserted in the reproduced signal from the first video tape recorder.

4 Claims, 13 Drawing Sheets

EDITING APPARATUS USING DELAY MEANS FOR INSERTING A DESIRED SIGNAL INTO A DESIRED PORTION OF A PRERECORDED SIGNAL AND FOR ERASING SEGMENTS OF A PRERECORDED SIGNAL WITHOUT CREATING A BLANK PORTION IN THE PRERECORDED SIGNAL

This application is a continuation of application Ser. No. 08/230,700, filed Apr. 21, 1994 now abandoned.

BACKGROUND OF THE INVENTION

1. Field of the Invention

The present invention relates to an editing machine for inserting a desired signal into a desired portion of a prerecorded signal and for erasing segments of a prerecorded signal and then moving the following signal portion forward so as to prevent a blank portion. This kind of edit is known as nonlinear edit.

2. Description of the Related Art

Nonlinear edit has been heretofore done on media which can be random-accessed on a real-time basis such as magnetic disks, optical disks, and semiconductor memories. However, these media have much smaller storage capacities than the capacity of magnetic tape and so they find only limited use. On the other hand, a recorder using a magnetic tape as its recording medium is unable to gain random access to the medium on a real-time basis and, therefore, very numerous operations are necessary to accomplish a nonlinear edit. Also, a very long time is required to perform the edit.

Figure 8:
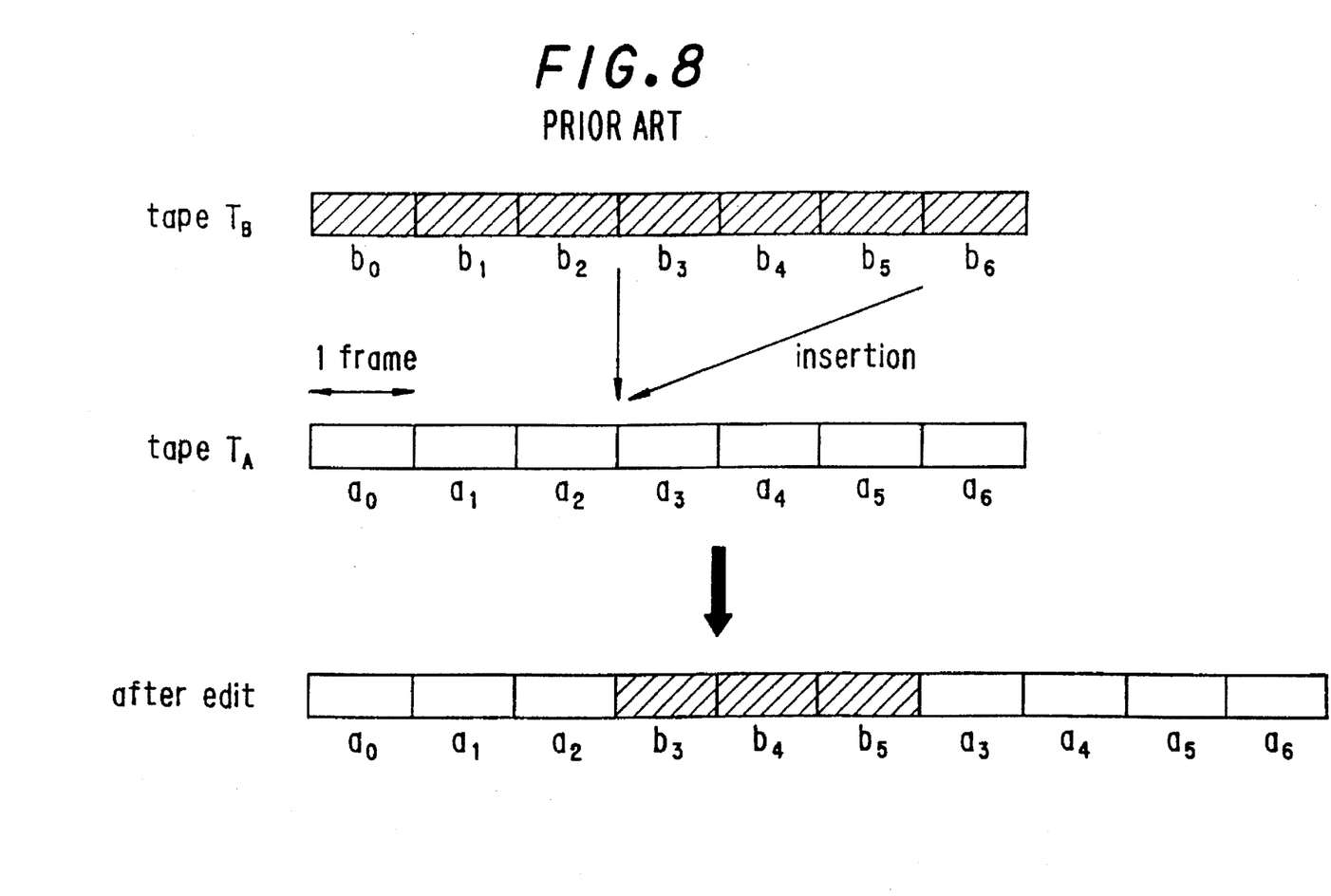
FIG. 8 is a diagram illustrating a nonlinear edit for inserting other video signal.

A method of performing a nonlinear edit is now described while taking a video tape recorder as an example. As shown in FIG. 8, successive segments $a_0, a_1, \ldots, a_6$ of a video signal are recorded on a tape $T_A$. Successive segments $b_3, b_4$, and $b_5$ of another video signal are recorded on another tape $T_B$. It is assumed that the successive segments $b_3, b_4$, and $b_5$ of the second video signal should be inserted between the segments $a_2$ and $a_3$.

Figure 9:
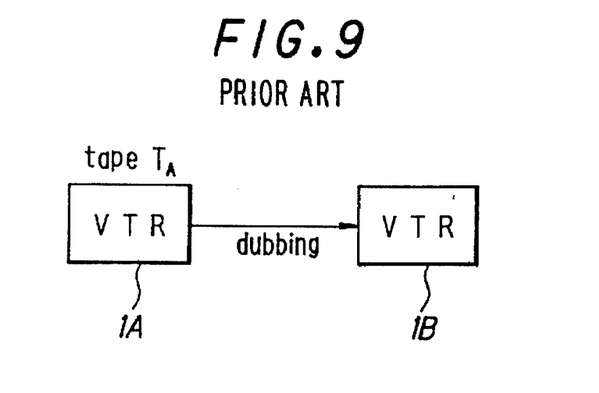
FIG. 9 is a diagram illustrating the manner in which a copied tape is created.

As shown in FIG. 9, the video signal recorded on the tape $T_A$ is dubbed onto the other tape by the use of two VTR units 1A and 1B, thus creating a copied tape $T_A'$.

Figure 10:
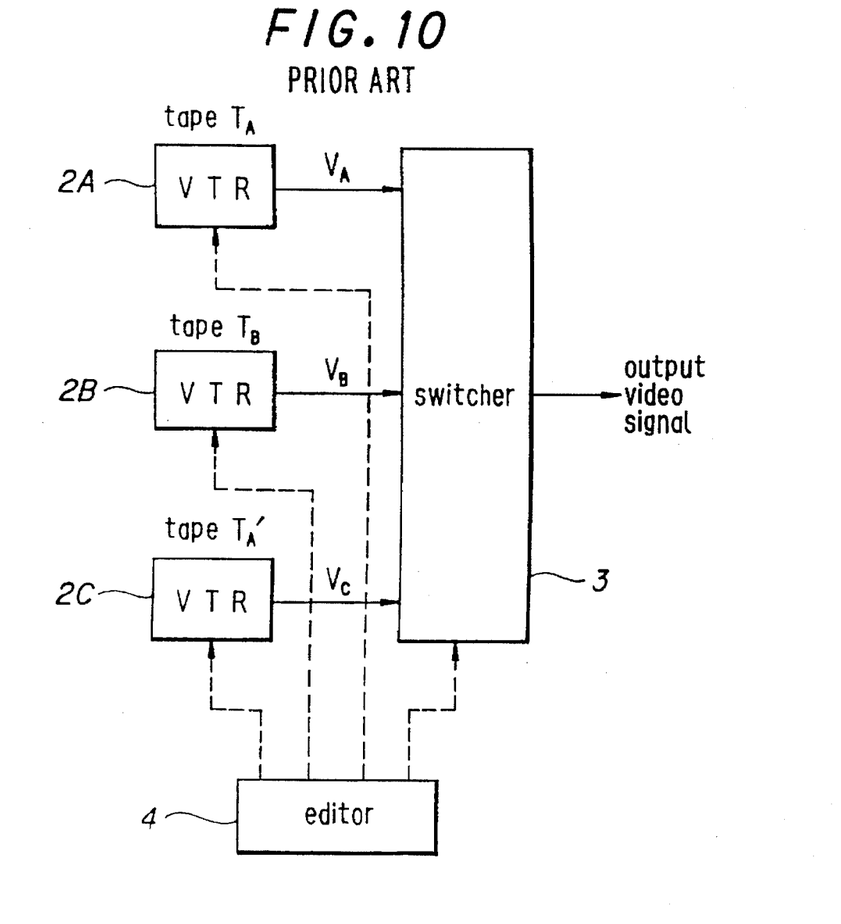
FIG. 10 is a block diagram of a conventional editing machine.

FIG. 10 shows an editing machine. VTR units 2A, 2B, and 2C play back tapes $T_A$, $T_B$, and $T_A'$, respectively. Reproduced video signals $V_A$, $V_B$, and $V_C$ produced from the VTR units 2A, 2B, and 2C, respectively, are supplied to a switcher 3. Playback operations of the VTR units 2A–2C and switching operation of the switcher 3 are controlled by an editor 4.

Figure 11:
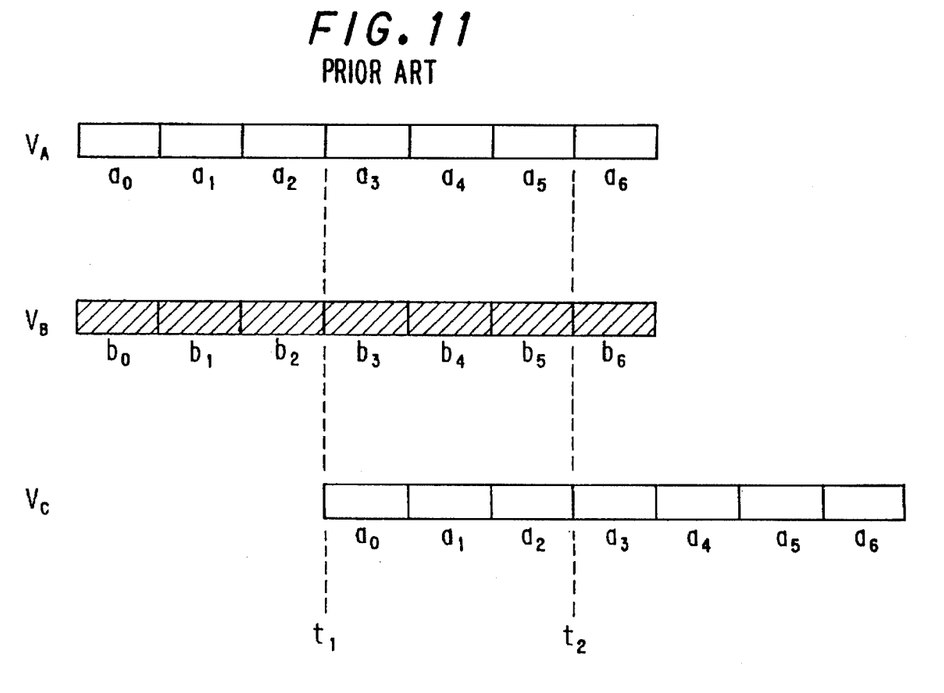
FIG. 11 is a diagram illustrating modified phases of VTR units and switching timing of the switcher of the editing machine shown in FIG. 10 when other signal is inserted.

The VTR units 2A–2C are controlled in such a way that the reproduced video signals $V_A$, $V_B$, and $V_C$ have a phase relation as shown in FIG. 11. The switcher 3 selects the video signal $V_A$ prior to instant of time $t_1$. The switcher selects the video signal $V_B$ during the interval between $t_1$ and $t_2$. Subsequently, the switcher selects the video signal $V_C$.

In this way, a video signal consisting of successive segments $a_0, a_1, a_2, b_3, b_4, b_5, a_3, \ldots$ can be obtained from the switcher 3. This output video signal is recorded by another VTR unit (not shown). As a result, a nonlinear edit as shown in FIG. 8 can be accomplished.

Figure 12:
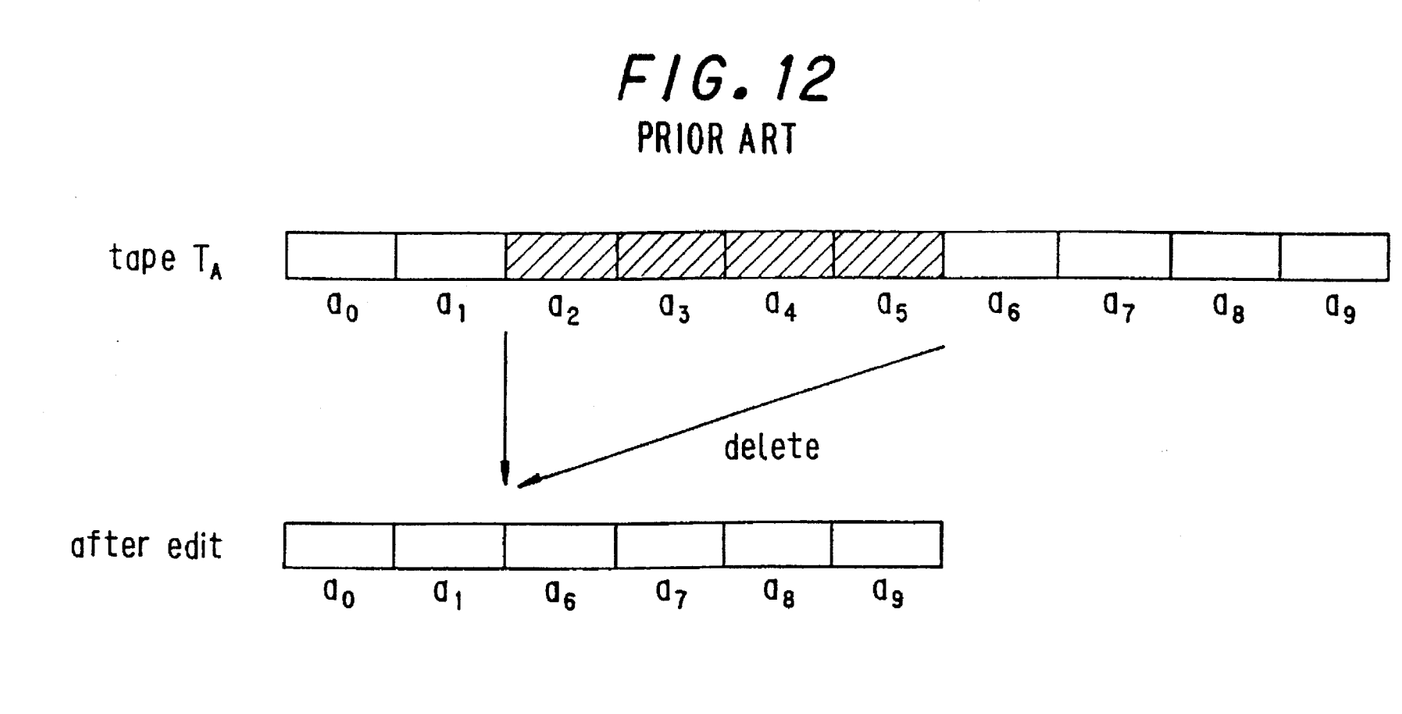
FIG. 12 is a diagram illustrating a nonlinear edit performed by the editing machine shown in FIG. 10 to delete a part of a prerecorded video signal.

Then, a situation in which the segments $a_2, a_3, a_4,$ and $a_5$ are deleted from the successive segments $a_0, a_1, \ldots a_8, a_9$ of a video signal recorded on the tape $T_A$ to obtain successive segments $a_0, a_1, a_6, a_7, \ldots$ of the video signal as shown in FIG. 12 is described.

Referring to FIG. 9, a video signal recorded on the tape $T_A$ is dubbed onto another tape by the use of two VTR units 1A and 1B to create a copied tape $T_A'$.

Figure 13:
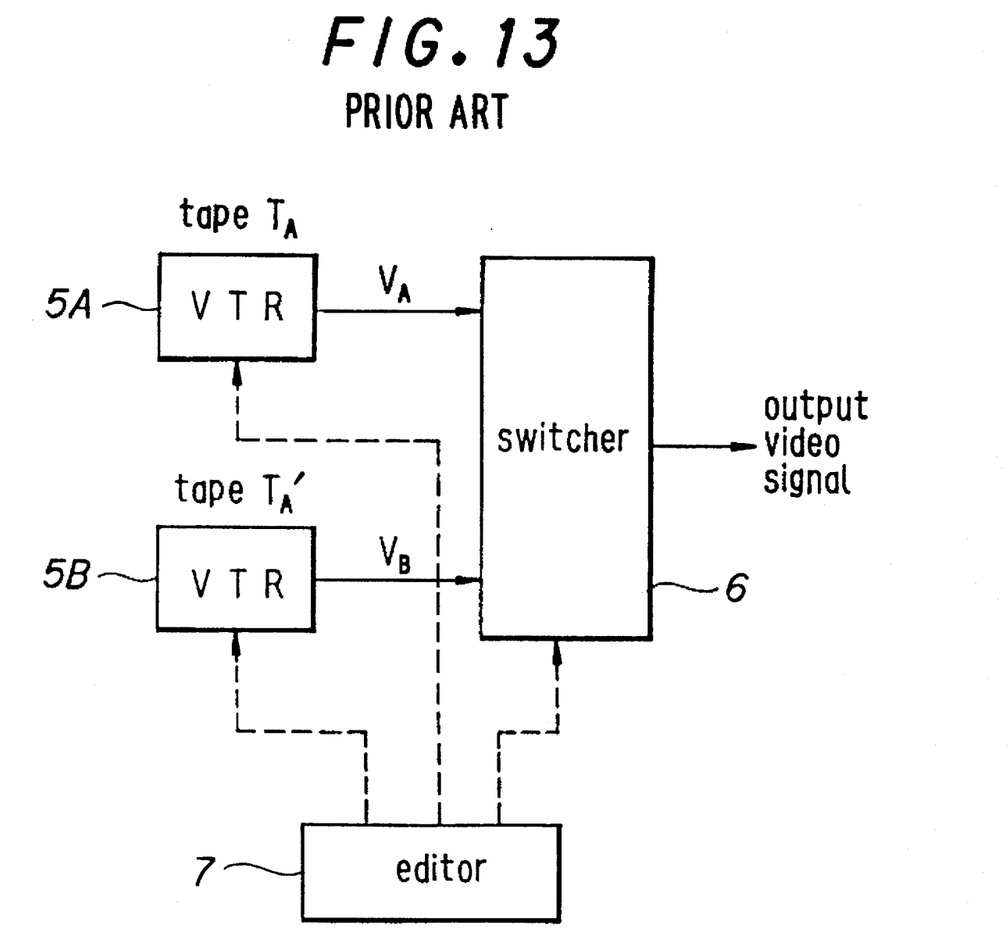
FIG. 13 is a block diagram of another conventional editing machine.

FIG. 13 shows an editing machine. VTR units 5A and 5B play back tapes $T_A$ and $T_A'$, respectively. Reproduced video signals $V_A$ and $V_B$ produced from the VTR units 5A and 5B, respectively, are supplied to a switcher 6. Playback operations of the VTR units 5A and 5B and switching operation of the switcher 6 are controlled by an editor 7.

Figure 14:
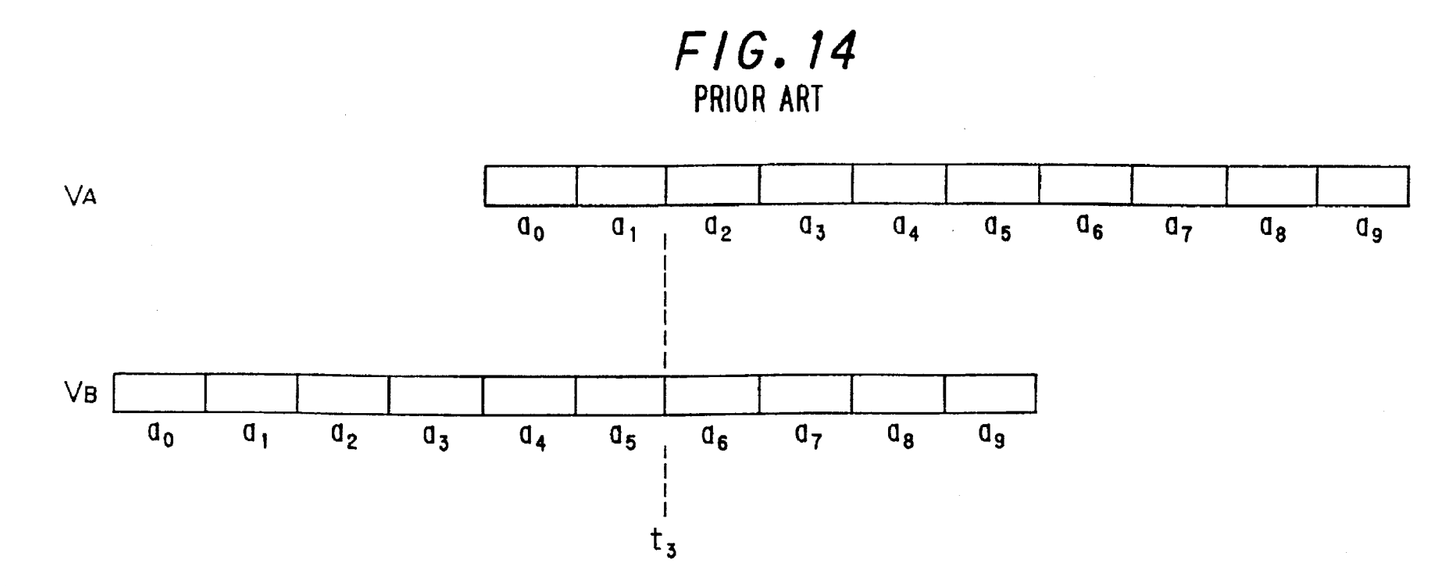
FIG. 14 is a diagram illustrating modified phases of VTR units and switching timing of the switcher of the editing machine shown in FIG. 13 when a part of a prerecorded signal is deleted.

The VTR units 5A and 5B are controlled in such a way that the reproduced video signals $V_A$ and $V_B$ have a phase relation as shown in FIG. 14. The switcher 6 is so controlled that it selects the video signal $V_A$ prior to instant of time $t_3$ and the video signal $V_B$ after the instant of time $t_3$. In this way, the output signal from the switcher 6 consists of successive segments $a_0, a_1, a_6, a_7$, etc. This output video signal is recorded by a separate VTR unit (not shown). As a result, a nonlinear edit as shown in FIG. 12 can be performed.

In order to perform a nonlinear edit by this conventional editing machine, it is necessary to perform a dubbing operation, for previously creating a copied tape. Also, in order to insert other signal, the three VTR units 2A–2C, the switcher 3, and a separate recording VTR unit are necessary. To delete a part of a prerecorded signal, the two VTR units 5A and 5B, the switcher 6, and the separate recording VTR unit are needed. In this way, a nonlinear edit requires a number of VTR units.

SUMMARY OF THE INVENTION

It is an object of the present invention to provide an editing machine capable of performing a nonlinear edit with a small number of VTR units without requiring a dubbing operation for previously creating a copied tape.

A first editing machine according to the invention comprises: a first playback machine acting to reproduce a first signal from a recording medium in the form of tape and having a delay circuit for delaying the reproduced signal to produce signals having a first amount of delay and a second amount of delay, respectively; a second playback machine for producing a second reproduced signal; and a switching circuit for switching among said signal having the first amount of delay, said signal having the second amount of delay, and said second reproduced signal. The switching circuit produces a signal in which the second reproduced signal from the second playback machine has been inserted in the first reproduced signal from the first playback machine.

A second editing machine according to the invention comprises: a playback machine for reproducing a signal from a recording medium in the form of tape and having a delay circuit for delaying the reproduced signal, the playback machine producing signals having a first amount of delay and a second amount of delay, respectively; and a switching circuit for switching between the signal of the first amount of delay and the signal of the second amount of delay. In the output signal from the switching circuit, a portion corresponding to a desired period has been deleted from the reproduced signal.

With the first editing machine described above, the first reproduced signal in which the second reproduced signal has been inserted can be obtained from the switching circuit simply by switching among the three signals, i.e., the signal having the first amount of delay reproduced by the first playback machine, the signal of the second amount of delay reproduced by the first playback machine, and the signal reproduced by the second playback machine. Consequently, a nonlinear edit for inserting other signal into a desired portion of a prerecorded signal can be performed by the use of only two playback machines without the need to perform a dubbing operation for previously creating a copied tape.

With the second editing machine described above, the reproduced signal from the playback machine from which a portion corresponding to a desired period has been deleted can be obtained from the switching circuit merely by switching between the signal of the first amount of delay and the signal of the second amount of delay produced from the playback machine. In consequence, a nonlinear edit for deleting a desired portion of a prerecorded signal and moving the following signal portion forward to prevent a blank portion can be performed, by using only one playback machine without the need to perform a dubbing operation for previously creating a copied tape.

Other objects and features of the invention will appear in the course of the description thereof, which follows.

DETAILED DESCRIPTION OF THE INVENTION

Figure 1:
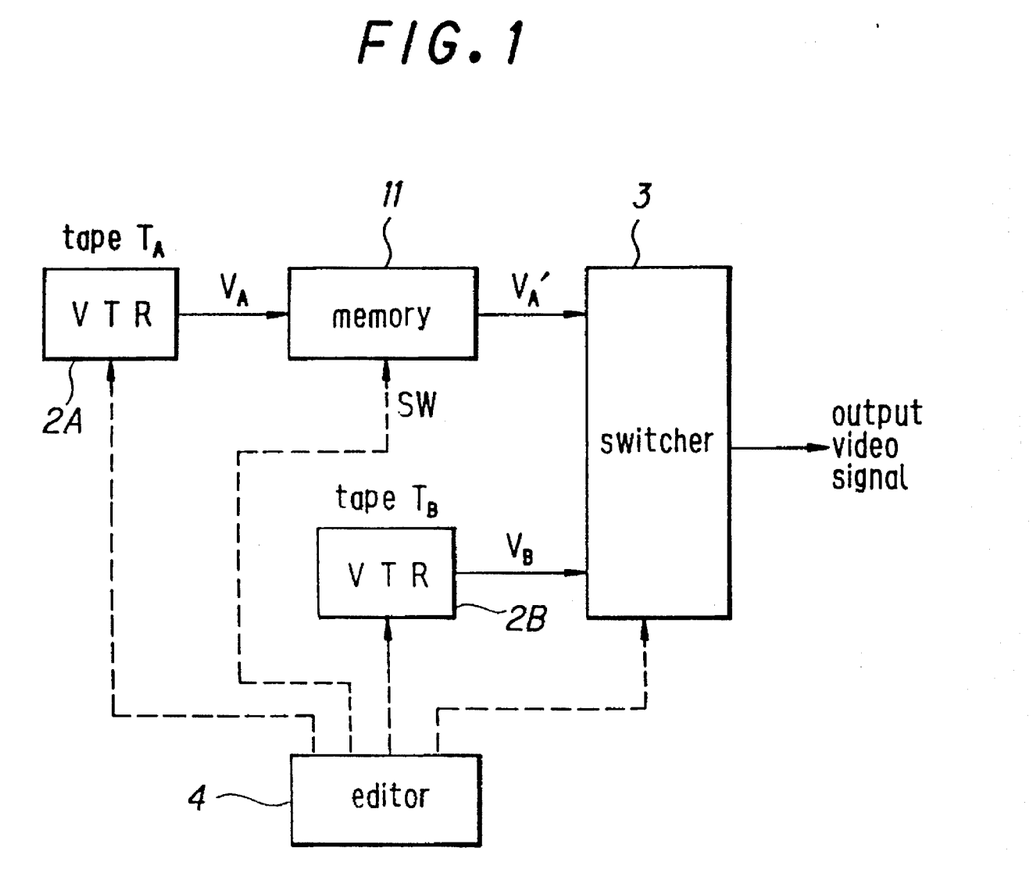
FIG. 1 is a block diagram of an editing machine according to the invention.

An example of the present invention is now described by referring to FIG. 1. In this example, a nonlinear edit is performed to insert another signal into a desired portion of a prerecorded signal. It is to be noted that like components are indicated by like reference numerals in various figures.

In FIG. 1, a VTR unit 2A reproduces a video signal $V_A$ from tape $T_A$. The video signal is supplied to a delay amount variable memory 11.

Figure 2:
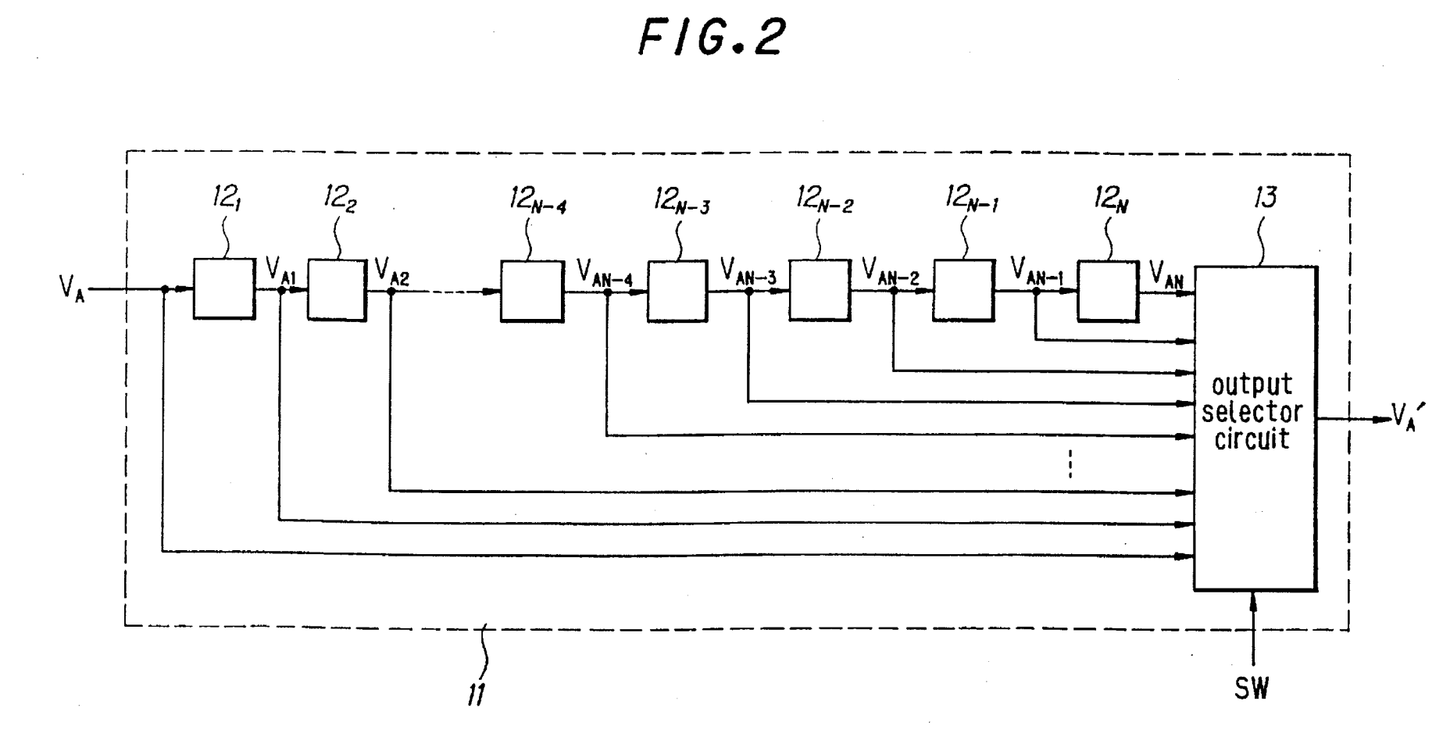
FIG. 2 is a circuit diagram of a delay amount variable memory used in the editing machine shown in FIG. 1.

The structure of the delay amount variable memory 11 is particularly shown in FIG. 2. The video signal $V_A$ is supplied to a series circuit of N frame memories $12_1$–$12_N$ which form delay circuits, respectively, each having a delay time of one frame period. The video signal $V_A$ and delayed video signals $V_{A1}$–$V_{AN}$ produced from the frame memories $12_1$–$12_N$, respectively, are supplied to an output selector circuit 13, which also receives an output selector signal SW from an editor 4. A video signal $V_A'$ produced from the output selector circuit 13 is delivered as the output signal from the delay amount variable memory 11. Where the reproduced video signal $V_A$ produced from the VTR unit 2A is an analog signal, an A/D converter (not shown) and a D/A converter (not shown) are disposed on the input side and on the output side, respectively, of the memory 11.

Referring back to FIG. 1, the video signal $V_A'$ produced from the delay amount variable memory 11 is supplied to a switcher 3. Another VTR unit 2B plays back tape $T_B$ and produces a reproduced video signal $V_B$ to the switcher 3. Playback operations of the VTR units 2A and 2B and switching operation of the switcher 3 are controlled by the editor 4.

Figure 3A:
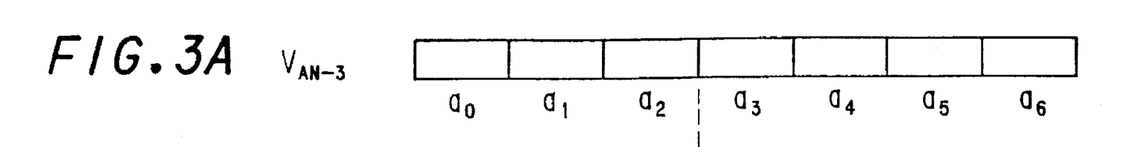
FIGS. 3A–3D are diagrams illustrating modified phases and switching timing when other signal is inserted during a nonlinear edit.
Figure 3B:
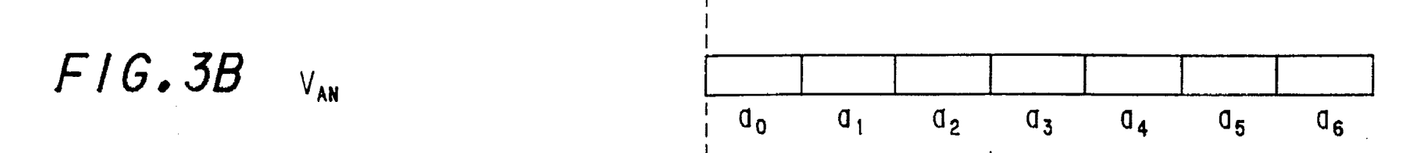
Figure 3C:
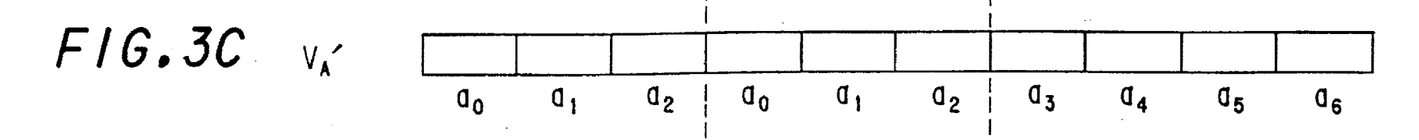

The operation of the editing machine constructed as described above is now described. We now take an example in which successive segments $b_3$, $b_4$, and $b_5$ of a video signal recorded on the tape $T_B$ are to be inserted between segments $a_2$ and $a_3$ of successive segments $a_0$, $a_1$, ..., $a_6$ of a video signal recorded on the tape $T_A$. Prior to instant of time $t_{11}$, the output selector circuit 13 selects a video signal $V_{AN-3}$ (FIG. 3A) produced from the frame memory $12_{N-3}$. Thereafter, the selector circuit selects a video signal $V_{AN}$ (FIG. 3B) produced from the frame memory $12_N$. Therefore, the video signal $V_A'$ produced from the delay amount variable memory 11 consists of successive segments $a_0$, $a_1$, $a_2$, $a_0$, $a_1$, ... $a_6$ shown in FIG. 3C.

Figure 3D:
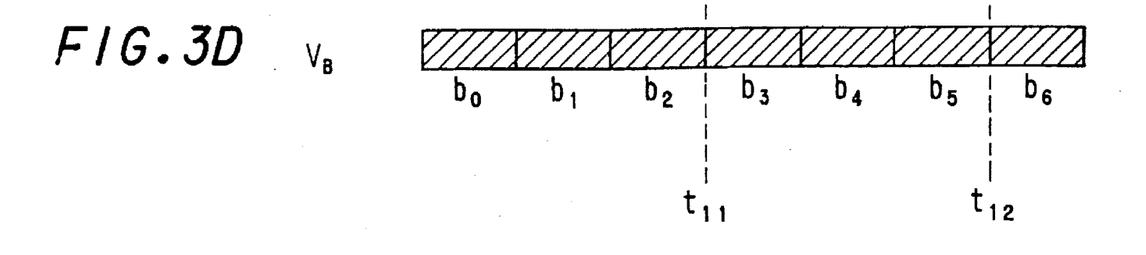

The editor 4 controls the playback operation of the VTR units 2A and 2B in such a way that the video signal $V_A'$ and the reproduced video signal $V_B$ (FIG. 3D) have a phase relation as shown. Prior to the instant $t_{11}$, the switcher 3 selects the video signal $V_A'$. In the period between the instants $t_{11}$ and $t_{12}$, the switcher selects the video signal $V_B$. Thereafter, the switcher again selects the video signal $V_A'$. As a result, an output video signal consisting of successive segments $a_0$, $a_1$, $a_2$, $b_3$, $b_4$, $b_5$, $a_3$, etc. can be obtained from the switcher 3. This input video signal is recorded by a separate VTR unit (not shown), so that a nonlinear edit as shown in FIG. 8 can be accomplished. Similarly, a video signal delayed up to the maximum delay amount (N frames) of the delay amount variable memory 11 can be inserted.

A video signal delayed by more than the maximum delay amount of the delay amount variable memory 11 can be inserted by controlling the various operations of the VTR unit 2A such as playback, stoppage, and previous rotation. We now take an example in which other video signal consisting of segments $b_1$–$b_L$ persisting for L seconds is to be inserted between segments $a_0$ and $a_1$ of successive segments $a_0$, $a_1$, $a_2$, etc. of a video signal prerecorded on tape $T_A$.

In this case, the VTR unit 2A is so controlled that it first delivers the segment $a_0$ and delivers the next segment $a_1$ after a lapse of L seconds. In particular, after the segment $a_0$ is produced, the tape is rotated rearwardly from the record position of the segment $a_1$ by an amount (X seconds) necessary for a modification of phase. Then, the playback is made to pause. After a lapse of (L–X) seconds, the playback is restarted, and a modification of phase is made. After a lapse of L seconds, the segment $a_1$ is delivered.

Figure 4A:
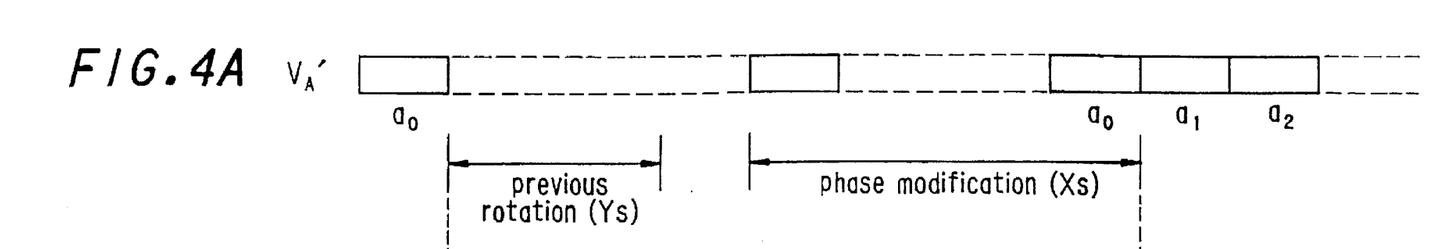
FIGS. 4A–4C are diagrams illustrating the control of VTR units, modified phases, and switching timing when other signal is inserted during a nonlinear edit.
Figure 4B:
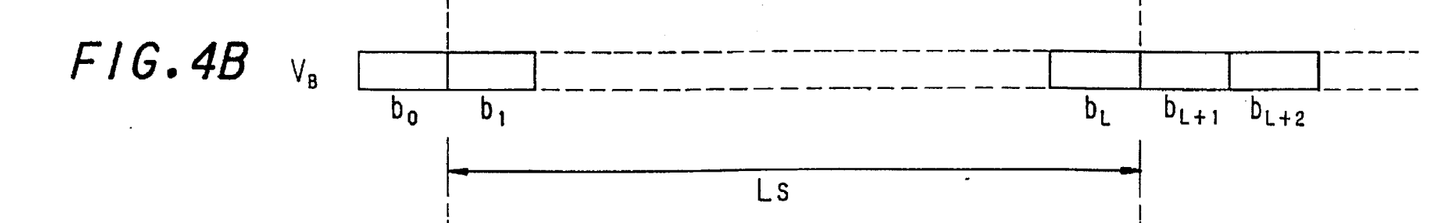
Figure 4C:
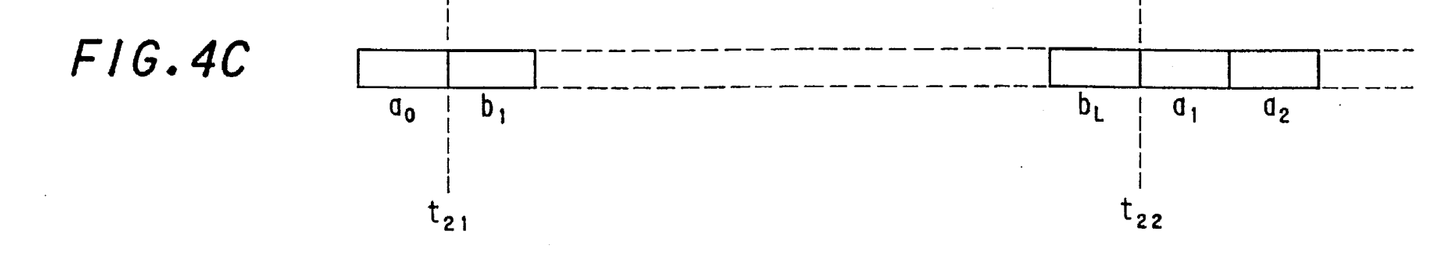

The output selector circuit 13 selects the video signal $V_A$. The playback operation of the VTR units 2A and 2B is controlled in such a way that the video signal $V_A'$ and the reproduced video signal $V_B$ produced from the VTR unit 2B have a phase relation as shown in FIGS. 4A and 4B. Prior to instant $t_{21}$, the switcher 3 selects the video signal $V_A'$. The switcher selects the video signal $V_B$ in the interval between $t_{21}$ and $t_{22}$. Thereafter, the switcher selects the video signal $V_A'$ again. Thus, the output video signal from the switcher 3 consists of successive segments $a_0$, $b_1$–$b_L$, $a_1$, $a_2$, ... as shown in FIG. 4C.

Similarly, a video signal persisting for (X+Y) seconds can be inserted. Assuming that the delay amount variable memory 11 has a maximum delay amount of (X+Y) seconds (N frames), a video signal of any length can be inserted by the configuration shown in FIG. 1. The minimum length is the period of one frame.

In this way, in the present embodiment, a nonlinear edit for inserting other signal into a desired portion of a prerecorded signal can be performed, using only two VTR units 2A and 2B as playback machines without requiring a dubbing operation for previously creating a copied tape.

Figure 5:
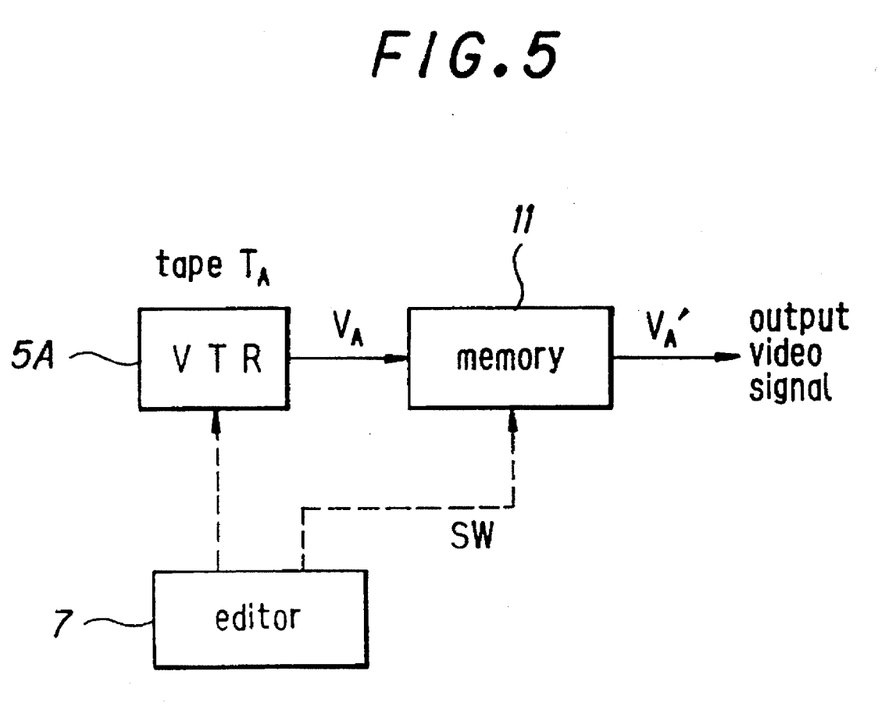
FIG. 5 is a block diagram of another editing machine according to the invention.

Another example of the invention is now described by referring to FIG. 5. In the present example, a nonlinear edit for deleting a part of a prerecorded signal and then moving the following signal portion forward so as to prevent a blank portion is performed.

In FIG. 5, a VTR unit 5A plays back tape $T_A$ and produces a reproduced video signal $V_A$ to a delay amount variable memory 11. This memory 11 is similar in structure to the delay amount variable memory 11 shown in FIG. 1. The playback operation of the VTR unit 5A and the switching operation of the memory 11 are controlled by an editor 7.

The operation of the editing machine constructed as described above is now described. We now take an example in which segments $a_2$, $a_3$, $a_4$, and $a_5$ are to be deleted from successive segments $a_0$, $a_1$, ..., $a_8$, and $a_9$ of a video signal recorded on tape $T_A$ to obtain a video signal consisting of successive segments $a_0$, $a_1$, $a_6$, $a_7$, etc.

Figure 6A:
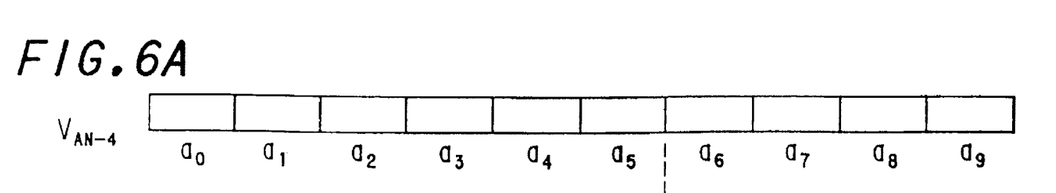
FIGS. 6A–6C are diagrams illustrating switching timing when a part of a prerecorded signal is deleted during a nonlinear edit.
Figure 6B:
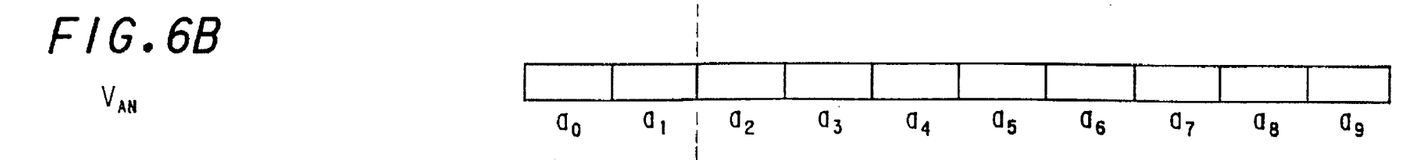
Figure 6C:
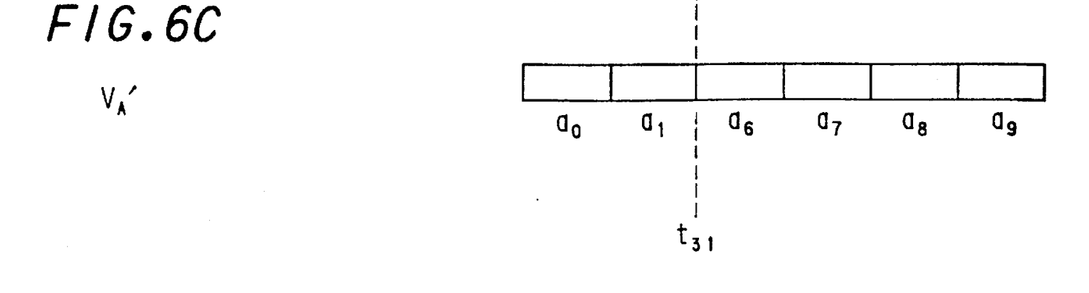

An output selector circuit (not shown in FIG. 5) similar to the output selector circuit 13 shown in FIG. 2 selects an output signal to be delivered from the delay amount variable memory 11. The selector circuit selects a video signal $V_{AN-4}$ (FIG. 6A) delivered from a frame memory $12_{N-4}$ prior to instant of time $t_{31}$. Thereafter, the selector circuit selects a video signal $V_{AN}$ (FIG. 6B) delivered from a frame memory $12_N$. Therefore, the delay amount variable memory 11 can produce an output video signal $V_A'$ consisting of successive segments $a_0$, $a_1$, $a_6$, $a_7$, ... as shown in FIG. 6C. This output video signal $V_A'$ is recorded by a separate VTR unit (not shown), whereby a nonlinear edit as shown in FIG. 12 can be performed. Similarly, a video signal delayed up to the maximum delay amount (N frames) of the delay amount variable memory 11 can be deleted.

A video signal delayed by more than the maximum delay amount of the delay variable memory 11 can be deleted by controlling the various operations of the VTR unit 5A such as playback, stoppage, and previous rotation. It is assumed that the maximum delay amount of the delay amount variable memory 11 is M seconds (N frames). We now discuss a situation in which a video signal consisting of segments $a_1$–$a_L$ persisting for L (L>M) seconds is deleted. If the output selector circuit 13 selects a video signal $V_N$ delivered from the frame memory $12_N$, the VTR unit 5A is so controlled that video signal segment $a_L$ is delivered when M seconds pass after the VTR unit 5A delivers video signal segment $a_0$. That is, the tape is wound rearwardly from the record position of the video signal segment $a_L$ by an amount (X seconds) necessary for a modification of phase. The playback is then made to pause. After a lapse of (M–X) seconds, the playback is restarted, and a modification of phase is made. After a lapse of M seconds, the video signal segment $a_L$ is delivered.

Figure 7A:
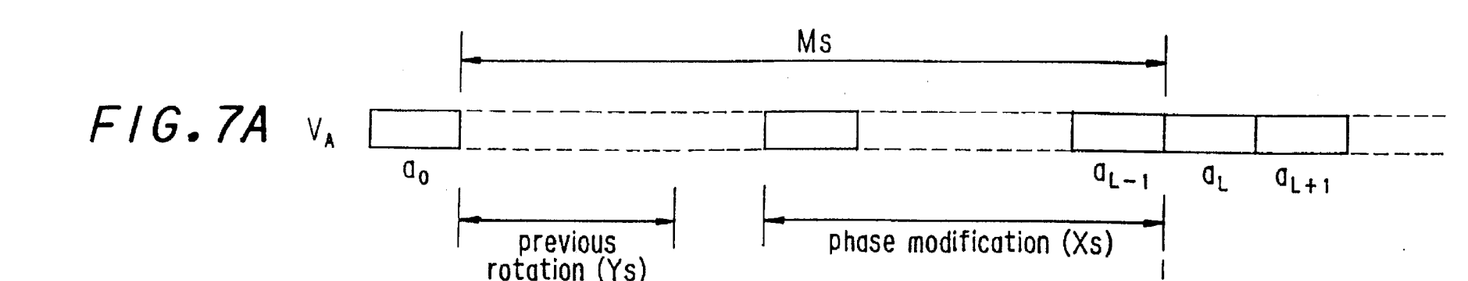
FIGS. 7A, 7B and 7C are diagrams illustrating the control of VTR units and switching timing when a part of a prerecorded signal is deleted during a nonlinear edit.
Figure 7B:
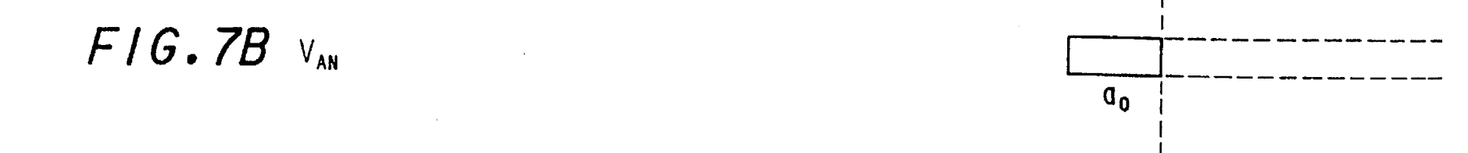
Figure 7C:
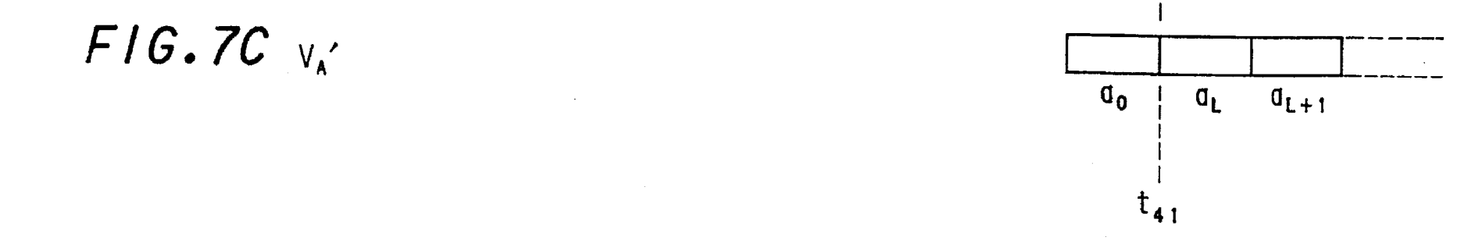

The video signal $V_N$ (FIG. 7B) delivered from the frame memory $12_N$ is selected by the output selector circuit 13 before M seconds pass after the video signal segment $a_0$ is reproduced, i.e., prior to instant of time $t_{41}$. Thereafter, the video signal $V_A$ (FIG. 7A) is selected. Thus, an output video signal $V_A'$ consisting of successive segments $a_0$, $a_L$, $a_{L+1}$, ... can be obtained from the delay amount variable memory 11.

Similarly, image portions which require times (Y seconds) not longer than (M–X) seconds for previous rotation can be deleted. It is assumed that 3 seconds are required for a modification of phase, the VTR unit 5A can have access to a position spaced 1 minute on the tape in 7 seconds, and the delay amount variable memory 11 having a maximum delay amount of 10 seconds is connected with the VTR unit 5A. In this case, a video signal persisting for up to 1 minute can be deleted.

In this way, in the present embodiment, a nonlinear edit for deleting a desired portion of a prerecorded signal and moving the following signal portion forward so as to prevent a blank portion can be performed, using only one VTR unit 5A as a playback machine without requiring a dubbing operation for previously creating a copied tape.

In the above embodiments, a single insertion operation and a single deletion operation have been described. Where segments of a prerecorded signal are replaced by segments of other signal having a different length, e.g., a video signal of Q frames are replaced by a video signal of P frames, if their time difference is within the variable range of the delay amount variable memory 11, then such an insertion or deletion operation can be carried out in one editing operation. Where segments of other signal are inserted into plural portions of a prerecorded signal or the plural portions are deleted, it is assumed that the playback machine for playing back the inserted video signal can produce a signal at predetermined timing at all times. An edit can be done continuously unless the timing at which a video signal is produced from the delay amount variable memory 11 is outside the variable range of the memory 11 during the edit.

In the above embodiments, the delay amount variable memory 11 is located outside the VTR units 2A and 5A. This memory 11 can also be incorporated in the VTR units 2A and 5A.

Also, in the above embodiments, the playback machines are VTR units. The unit of the delay introduced by the delay amount variable memory 11 is the period of one frame. The unit of the delay can be set to the period of one field, using a field memory. Furthermore, the present invention can be similarly applied to cases where signals other than video signals such as audio signals are treated. In this case, a unit adapted for the treated signal can be used as the unit of the delay. In the case of an audio signal, the unit is a sampling unit.

In the first editing machine described above, the first playback machine produces signals having the first amount of delay and the second amount of delay, respectively. A signal consisting of the reproduced signal from the first playback machine in which the reproduced signal from the second playback machine has been inserted can be obtained from the selector circuit simply by switching among the signal of the first amount of delay, the signal of the second amount of delay, and the reproduced signal from the second playback machine. A nonlinear edit for inserting other signal in a desired portion of a prerecorded signal can be performed, using only two VTR units as playback machines without requiring a dubbing operation for previously creating a copied tape.

In the second editing machine described above, the reproduced signal which is produced from the playback machine and from which a portion corresponding to a desired period has been deleted can be obtained from the selector circuit simply by switching between the signals from the playback machine, the signals having the first and second amounts of delay, respectively. A nonlinear edit for deleting a desired portion of a prerecorded signal and moving the following signal portion forward so as to prevent a blank portion can be performed, using only one VTR unit as a playback machine without requiring a dubbing operation for previously creating a copied tape.

What is claimed is:

1. An editing machine for enabling a desired number (D) of frames of data of one signal to be inserted into another signal, said editing machine comprising:

an editor;

a first playback machine, in communication with said editor, acting to reproduce a first signal representing data from a plurality of frames from a recording medium in the form of tape;

a delay circuit for receiving the reproduced first signal from said first playback machine, said delay circuit having a plurality of serially connected frame memories for providing delayed output signals and means receiving said reproduced first signal and a delayed output signal from each of said plurality of serially connected frame memories for selecting two signals therefrom and for combining the selected two signals so as to form a combined signal representing a sequence of frames in which the data corresponding to (D) number of frames are repeated in response to an output signal supplied from said editor;

a second playback machine, in communication with said editor, for producing a second reproduced signal; and a switcher circuit, in communication with said editor, for switching among said combined signal and said second reproduced signal so as to produce an output edited signal in which at least a portion of said second reproduced signal corresponding to said desired number (D) of frames has been inserted into said combined signal.

2. The editing machine of claim 1, wherein said delay circuit has a second time taken to previously rotate said tape rearwardly by a first time necessary for a modification of phase, and wherein said delay circuit further has a maximum delay amount exceeding the sum of said first time and said second time.

3. An editing machine for deleting a desired portion of a reproduced signal, said editing machine comprising:

an editor;

a playback machine, in communication with said editor, acting to reproduce a signal from a recording medium in the form of tape;

a delay circuit for receiving the reproduced signal from said playback machine, said delay circuit having a plurality of serially connected frame memories for providing delayed output signals and means receiving said reproduced signal and a delayed output signal from each of said plurality of serially connected frame memories for selecting two signals therefrom in response to an output selecting signal supplied from said editor;

a switcher circuit, in communication with said editor, for switching between the two selected signals so as to produce an output edited signal in which said desired portion of said reproduced signal from the playback machine has been deleted and which represents continuous frames of data without a blank portion adjacent to a location wherein said desired portion was deleted.

4. The editing machine of claim 3, wherein said delay circuit has a second time taken to previously rotate said tape rearwardly by a first time necessary for a modification of phase, and wherein said delay circuit further has a maximum delay amount exceeding the sum of said first time and said second time.

* * * * *